E. K. BATES.
OFFSET MECHANISM FOR SAWMILL CARRIAGES.
APPLICATION FILED JUNE 10, 1919.
1,365,297.
Patented Jan. 11, 1921.
2 SHEETS—SHEET 1.
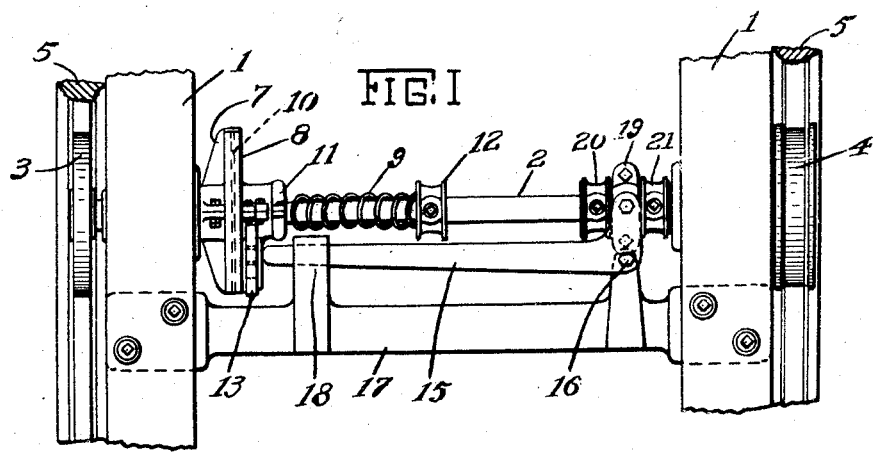
FIG. I
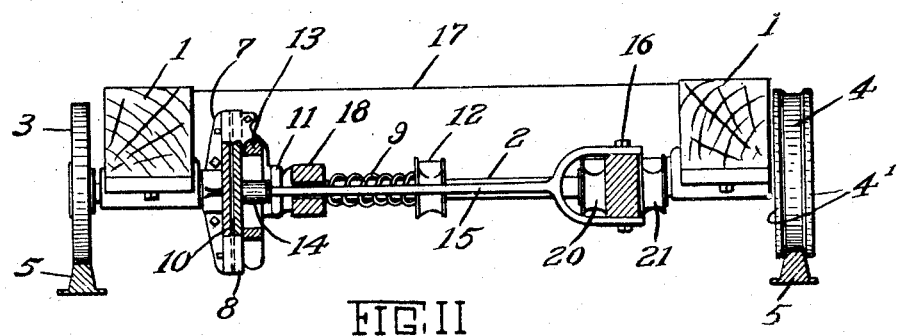
FIG. II
Inventor
Edward K. Bates
By Otis Spaith
Attorney E. K. BATES.
OFFSET MECHANISM FOR SAWMILL CARRIAGES.
APPLICATION FILED JUNE 10, 1919.
1,365,297.
Patented Jan. 11, 1921.
2 SHEETS—SHEET 2.
FIG. III
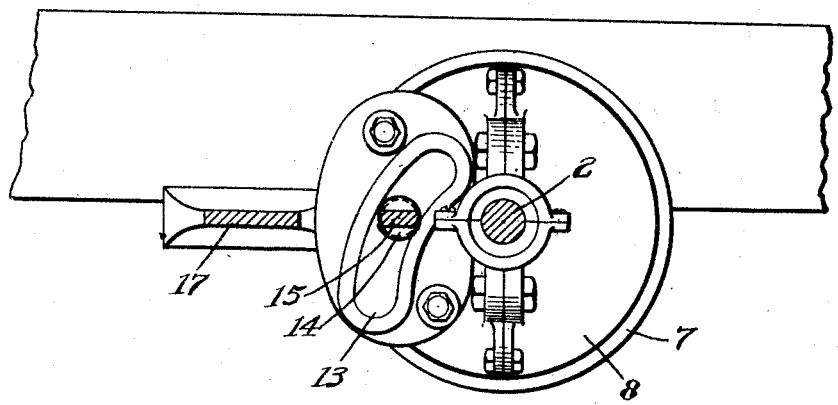
FIG. IV
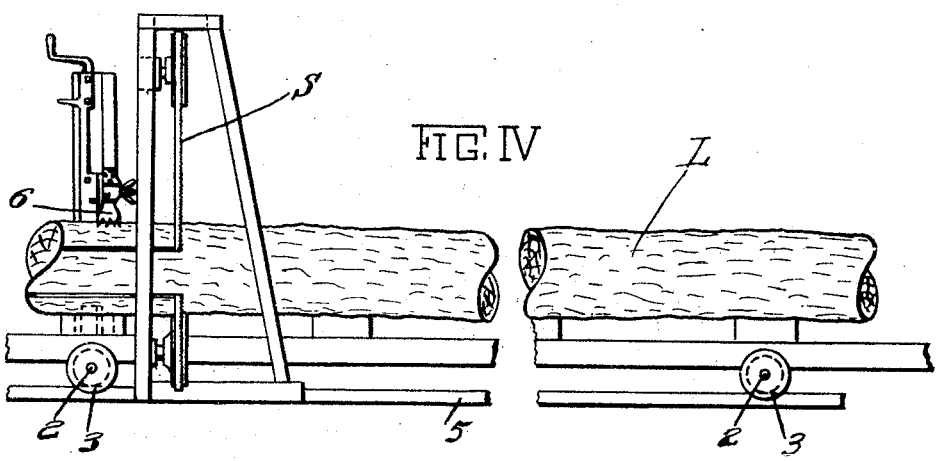
Inventor
Edward K. Bates
By Ellis Spear
Attorney

UNITED STATES PATENT OFFICE.

EDWARD KIMBALL BATES, OF MONTPELIER, VERMONT, ASSIGNOR TO LANE MANUFACTURING COMPANY, OF MONTPELIER, VERMONT, A CORPORATION OF VERMONT.

OFFSET MECHANISM FOR SAWMILL-CARRIAGES.

1,365,297.           Specification of Letters Patent.       Patented Jan. 11, 1921.

Application filed June 10, 1919. Serial No. 303,025.

*To all whom it may concern:*

Be it known that I, EDWARD K. BATES, a citizen of the United States, residing at Montpelier, county of Washington, State of Vermont, have invented certain new and useful Improvements in Offset Mechanism for Sawmill-Carriages, of which the following is a specification.

This invention relates to automatic offset mechanism for saw mill carriages. In such apparatus, the saw mill carriage is reciprocated past the saw blade position of the sawing machine, and the cut is made on the forward or feeding stroke of the carriage. In returning the carriage to its initial position to make a fresh cut, it is desirable that the log automatically be slightly set back or offset relative to the saw blade so that it will clear the blade in the return movement of the carriage. Various expedients have been devised for accomplishing this result, but in the main they have all been complicated and unwieldy devices requiring the use of cumbersome timbers, rails, etc. in conjunction with the mechanism to furnish operating power.

To the end therefore of providing simple, effective, and durable mechanism of the class indicated, I have devised my present invention. According to my invention, the offset mechanism is located between axle bearings on the carriage so that the weight is carried directly by the framing and truck axle, and receives its power solely from the truck axle, thus dispensing with complicated driving devices to furnish operating power. The offsetting action is controlled by the position of the carriage and is entirely automatic, and the parts are so constructed and arranged as to permit ready attachment and removal for purposes of repair or assembly without requiring removal of the truck axles from the carriage. I thus combine simplicity of construction and assembly with an automatic drive that is positive and certain under all conditions of operation.

These and various other features of advantage which will appear more fully hereinafter are secured in the devices of the present invention, the construction and operation of which, together with a selected embodiment which well illustrates the principles involved, is described in the following specification and shown in the drawings forming a part thereof. Throughout the specification and drawings like reference characters are correspondingly applied, and in the drawings:—

Figure 1 is a partial plan view of a saw machine carriage equipped with my invention.

Fig. 2 is a transverse section thereof.

Fig. 3 is a partial side elevation, and

Fig. 4 is a view illustrative of the operation of my invention.

I have indicated at 1 the carriage framing which is supported upon trucks comprising spaced axles 2 and wheels 3 and 4 fast on said axles and operating on suitable tracks 5 whereby the carriage may be reciprocated back and forth past the saw blade position, indicated at S, of the sawing machine.

The framing 1 supports suitable head blocks upon which a log L or other work to be sawed is adapted to be clamped by any suitable clamping mechanism.

The axles revolve in suitable bearings secured to the framing and the framing has a slight lateral movement upon the trucks to permit the log to be slightly set back or offset from the saw blade on the non-cutting movement of the carriage, thereby to automatically clear the log of the blade as the carriage is withdrawn to make a fresh cut. Preferably the wheels 4 most distant from the longitudinal plane of the saw blade are flanged, as indicated at $4^1$, to embrace both sides of the track 5 and prevent lateral displacement in the offsetting action of the machine.

My automatic offsetting mechanism is mounted directly over the truck axle which not only sustains the weight, but itself furnishes the sole driving power, thus obviating the necessity of special driving apparatus.

Preferably two or more mechanisms will be mounted at the proper places along the carriage whereby both ends of the carriage will be moved simultaneously and equidistantly. Inasmuch as the devices, however, are duplicates, a description of one will suffice herein.

My improved offset mechanism comprises a friction driving mechanism operated from the axle, and a cam-actuated frame shifting lever operated thereby according to the direction of movement of the carriage. The driving mechanism includes a relatively-fixed disk 7 fast on the axle to rotate there-with at all times, and a relatively movable disk 8 adapted to be slid along the axle into engagement with disk 7 by a heavy coil spring 9 confined about the axle, there being an interposed lining of friction material 10 between disks 7 and 8. The disk 8 is preferably sectional, comprising two semi-circular pieces bolted together by bolts, which are loose on the axle. The spring 9 is confined between a split recessed collar 11 loose on the axle and adapted to abut disk 8 and a setting collar 12 adjustable on the axle. The collar 11 takes the end thrust of the spring, to which pressure is applied by setting collar 12 in proper position on the axle to compress the spring, and this pressure is applied to disk 7 through disk 8 and lining 10, causing disk 8 to turn with disk 7. Disk 8 has attached thereto a positive cam segment 13, in the slot of which works the thimbled end 14 of a frame shifting lever 15 which is forked at its opposite end and pivoted, as indicated at 16, to a girt or strut 17 rigidly connecting the side timbers of the carriage framing, and is guided and restrained against up and down movement in a slot cut in an ear 18 projecting horizontally from girt 17. Pivoted to lever 15 between the forks thereof is a split collar 19 which is loose on the axle and is adapted to be held in fixed position by set collars 20 and 21.

The cutting operation is performed in the forward or feeding movement of the carriage past the saw blade position, and the log is automatically offset to clear the saw blade in the return motion of the carriage. In this return motion the disk 7 which rotates with the truck axle in both the feeding and return movements of the carriage, revolves in the opposite direction to its direction of rotation on the feeding movement, and the opposite rotative tendency is transmitted to disk 8, causing said disk to rotate with disk 7 to the limit of the slot in cam segment 13, which slot being formed on an increasing radius, carries the end 14 of the lever 15 with it. The fulcrum end of the lever is securely held in fixed position on the axle, however, and the lever therefore swings laterally, and since the girt 17 to which the lever is pivoted is fixed to the carriage frame, the carriage and with it the log is automatically given a lateral or offsetting movement sufficient to clear the log from the saw blade. This offsetting movement need be only slight and is permitted by the slight lateral movement allowed the framing on the trucks, as explained hereinbefore.

The slot in ear 18 not only prevents up and down motion of the lever 15, but when the end of the slot in cam 13 contacts the thimble 14 of said lever, automatically stops the offsetting action and holds disk 8 and its coöperating parts in position until the direction of travel of the carriage is reversed, whereupon the offset mechanism operates in the reverse direction.

By connecting the levers 15 of the duplicate offsetting mechanisms, as by a rod or the like operating in conjunction with a lever-provided locking device (not shown), the mechanism may be locked, if desired, so as not to operate upon backward movement of the carriage until a complete cut has been made.

Various other modifications in the operation and construction of my device may obviously be resorted to if within the limits of the appended claims.

What I therefore claim and desire to secure by Letters Patent is:

1. Automatic offsetting mechanism for traveling saw mill carriages, comprising in combination with the carriage and its way, a friction member fast on a truck axle of the carriage, a coöperating friction member loose on said axle, a spring coiled about said axle normally urging said loose member toward said fast member, a cam fast to said loose friction member, and a lever operatively connected to the carriage frame and operated by said cam for automatically shifting the carriage laterally upon a reversal of the direction of carriage travel.

2. Automatic offsetting mechanism for traveling saw mill carriages, comprising in combination with a carriage way and a carriage having capacity for lateral movement upon its trucks, means for preventing lateral displacement of the trucks from the way in such lateral movement, a pair of coöperative friction members, one fast and one loose on a truck axle, a spring active upon said loose friction member to urge it toward said fast member, means for varying the tension of said spring, a cam having a slot and fast to said loose friction member, a strut rigidly connecting the side members of the carriage framing, a lever pivoted to said strut and having one end operating in the slot of said cam, a collar sleeved about the truck axle and pivoted to the opposite end of said lever, and a guide constructed to permit lateral movement and to prevent vertical movement of said lever under the action of said cam.

3. The combination with a traveling carriage having capacity for limited lateral movement upon its trucks, of a lever having a short arm rotatively engaging a truck axle but fixed against longitudinal movement thereon and having a long arm extending along said axle, and a cam frictionally mounted on said axle and operatively engaging the free end of the long arm of the lever.

4. The combination with a traveling carriage having capacity for limited lateral movement upon its trucks, of a lever pivoted at one side of the carriage frame and having a short arm rotatively engaging a truck axle but fixed against longitudinal movement thereon and having a long arm disposed substantially parallel to said axle, and a cam frictionally mounted on said axle and operatively engaging the free end of the long arm of the lever.

5. The combination with a traveling carriage having capacity for limited lateral movement upon its trucks, a circumferential cam frictionally mounted on a truck axle, a lever engaging said cam at one end and rotatively engaging said axle at its other end, and means to prevent longitudinal movement of said lever on said axle.

6. The combination with a traveling carriage having capacity for limited lateral movement upon its trucks, of a friction mechanism operated from a truck axle, a cam driven by said friction mechanism, and a lever engaging said cam at one end and rotatably engaging said axle at its other end.

7. The combination with a traveling carriage having capacity for limited lateral movement upon its trucks, of a friction mechanism operated from a truck axle, a cam driven by said friction mechanism, and a lever having a fixed fulcrum and operating between said cam and the carriage.

8. The combination with a traveling carriage having capacity for limited lateral movement upon its trucks, of a friction mechanism operated from a truck axle, a cam operated by said friction mechanism, and a shift connection to the carriage operated by said cam.

In testimony whereof I affix my signature in presence of two witnesses.

EDWARD KIMBALL BATES.

Witnesses:
R. R. PIERCE,
D. F. McGOVERN.